Nov. 26, 1963 G. A. ROTHFUSS 3,112,030
DEVICE FOR LABELING AND HOLDING TAPE ON REEL
Filed June 29, 1960
2 Sheets-Sheet 1
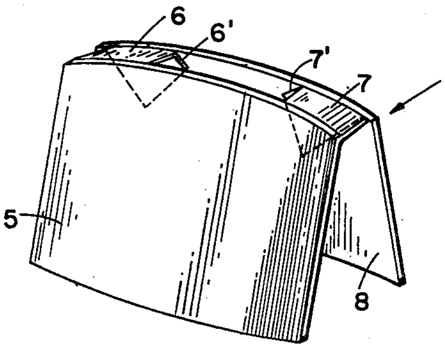
FIG. 1
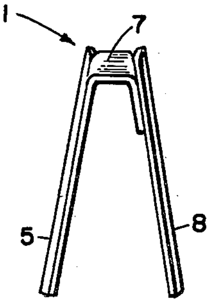
FIG. 2
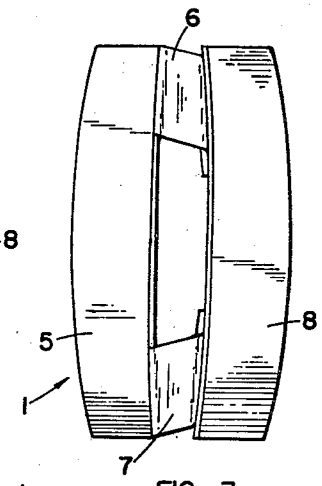
FIG. 3
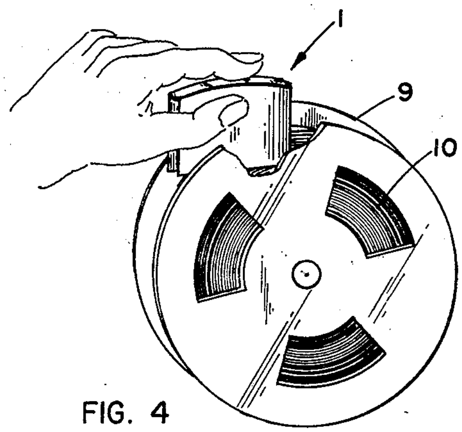
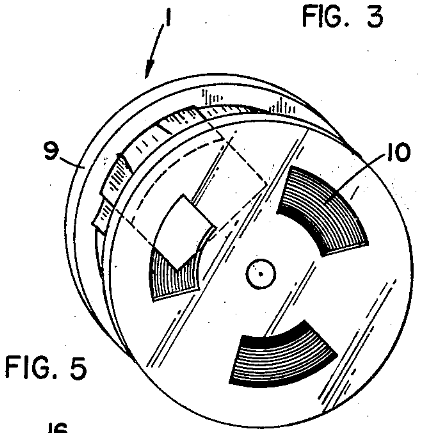
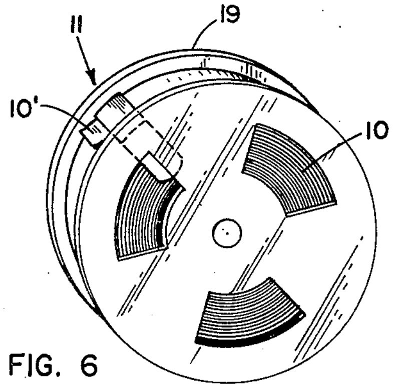
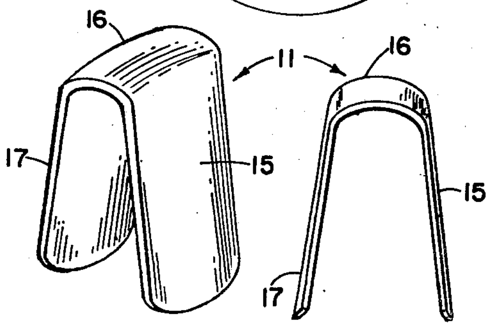
FIG. 7 FIG. 8
INVENTOR
GEORGE A. ROTHFUSS
BY
ATTORNEY Nov. 26, 1963 G. A. ROTHFUSS 3,112,030

DEVICE FOR LABELING AND HOLDING TAPE ON REEL

Filed June 29, 1960 2 Sheets-Sheet 2

INVENTOR
GEORGE A. ROTHFUSS

BY [signature]
ATTORNEY

United States Patent Office 3,112,030
Patented Nov. 26, 1963

3,112,030
DEVICE FOR LABELING AND HOLDING TAPE ON REEL
George A. Rothfuss, Rte. 1, Madison, Wis.
Filed June 29, 1960, Ser. No. 39,603
2 Claims. (Cl. 206—53)

This invention relates to a device for labeling thin elongated strip film material on a reel and for retaining in place the end of a strip of such film material on a reel.

Heretofore no adequate, simple, handy, inexpensive means have been provided for labeling magnetic tape carried on a reel so that the user can with great facility install a reel on a magnetic tape machine to record or play back the proper side of the tape or can easily maintain adequate labeling to indicate what material is on each side of a strip of magnetic tape on a reel or determine which way tape is to be wound on a reel to prevent subsequent confusion as to which side of the reel is to be used. Likewise no simple, effective, handy, inexpensive means has been provided for retaining in place the end of a strip of magnetic tape or movie film on a reel.

It is therefore an object of this invention to provide such a device for labeling a reel and a strip of magnetic tape on a reel.

It is another object of the invention to provide such a device for retaining in place the end of a strip of magnetic tape or motion picture film on a reel.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a perspective view from one side of one embodiment of the invention;

FIGURE 2 is an end view of the embodiment of FIGURE 1;

FIGURE 3 is a perspective view from above of the embodiment of FIGURES 1 and 2;

FIGURE 4 is a perspective view of the device of the embodiment of FIGURES 1, 2, and 3 being installed on a reel carrying thin elongated strip film material such as magnetic tape or motion picture film;

FIGURE 5 is a perspective view of the embodiment of FIGURES 1, 2, and 3, installed on such a reel;

FIGURE 6 is a perspective view of another embodiment;

FIGURE 7 is a perspective view of the embodiment of FIGURE 6 from a different angle;

FIGURE 8 is a perspective view of the embodiment of FIGURES 6 and 7 installed on a reel carrying thin elongated strip film material;

Figures 9, 10, 11:
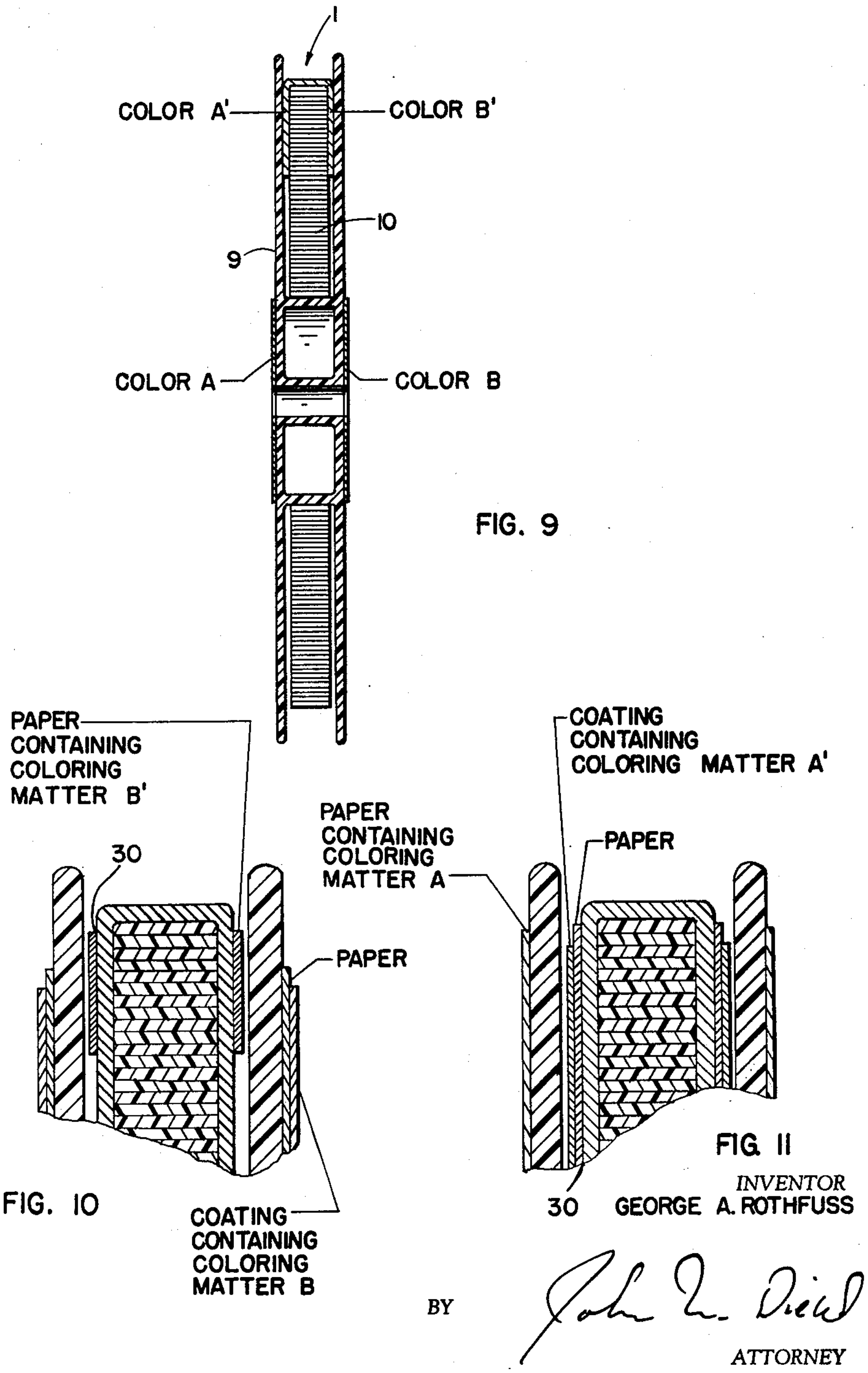
FIGURE 9 is a cross-sectional view of the embodiment of FIGURES 1, 2, and 3, installed on a reel of thin elongated strip film material.
FIGURE 10 is a fragmentary cross-sectional view of modification of the embodiment of FIGURE 9.
FIGURE 11 is a fragmentary cross-sectional view of another modification of the embodiment of FIGURE 9.

Referring now to FIGURES 1, 2 and 3, there is shown one embodiment of the invention indicated generally by the numeral 1, comprising a first thin planar member 5 joined by connecting members 6 and 7 to a second thin planar member 8. Each of these members may be made of paper, paper board, cardboard, plastic or metal.

As shown in FIGURES 4 and 5 the embodiment of FIGURES 1, 2 and 3 is installed in a reel 9 having thin elongated strip film material 10 coiled therearound. Device 1 retains in place the end 10' of material 10, thereby preventing it from unwinding or being unwound from the reel until device 1 is intentionally removed. Material 10 may be magnetic tape, motion picture film or other like thin elongated strip film material and is preferably made of plastic film material but may suitably consist of or comprise paper, metal or the like.

Another embodiment of the invention is shown in FIGURES 7 and 8 wherein an embodiment in accordance with the invention is indicated generally as 11 which comprises a first substantially planar member 15 joined by connecting member 16 to second planar member 17.

The device of FIGURES 7 and 8 is preferably made of metal but may suitably be made of plastic or even of paper, paper board, cardboard or the like.

As shown in FIGURE 6, device 11 may suitably be installed on a reel 19 to hold in place thereon thin strip film material 10 by retaining end 10' of said material.

It may be noted that members 5 and 8 and members 15 and 17 respectively are retained at an acute angle, extending outwardly from each other, by connecting members 6 and 7 and connecting member 16 respectively, when devices 1 and 11 respectively are not installed on a reel. To accomplish this, members 6 and 7 and 16 may be stressed, as by being made of a material having the characteristics of a spring. Alternatively, two connecting members such as members 6 and 7 may be provided and the members may be each planar in form and may be integrally attached to one of the planar members such as member 5 and may then be bent over and attached to a second planar member 8 with their ends 6' and 7' being bent inwardly toward each other somewhat so that upon being fastened to a planar member such as 8 (by any suitable means such as welding or adhesive bonding), members 5 and 8 are caused to be sprung apart so that they extend outwardly from each other, generally at an acute angle.

It may be noted that members 6 and 7 are disposed so as to be substantially more or less tangent to the outer layer of a strip of thin film material when installed on a reel carrying a coil of such material. Such tangency is desirable and preferred but not necessary.

As shown in FIGURE 4, when a device in accordance with the invention such as device 1 or device 11 is installed on a reel, the planar members such as 5 and 8 or 15 and 17 may be manually forced together by the fingertips to cause them to be slidably inserted between the sides of the reel and the elongated strip film material carried by the reel, the members being sufficiently thin to be slidable between the sides of the reel and the film material so that when the device is installed the members extend respectively between the two sides of the reel and the film material carried by the reel.

In accordance with a preferred embodiment the planar members of the device such as members 5 and 8 or 15 and 17 may preferably be made rather large as in the embodiment of FIGURES 1–3 so that suitable wording may be written or otherwise inscribed on the outer surface of each of the planar members to indicate the nature of the material recorded on the tape to which the device is to be applied.

In accordance with the invention and as indicated in FIGURES 9–11, one side of the labeling and holding device of the invention is identified with one color and the other side is identified with a different color. One side of a reel with which the device is to be used is identified with a color corresponding to the color on the first side of the device and the other side of the reel is identified with a color corresponding to the color on the second side of the device.

Thus as shown in FIGURE 9, one side of reel 9 may have color A, for example by reason of being made of a colored plastic (which may be accomplished by introducing coloring matter such as dye or pigment into the plastic mix from which the side of the reel is molded) and the other side of the reel may have color B. One side of device 1 may have color A′ which corresponds to color A, being the same or somewhat similar thereto, which may be provided for example by causing one of the thin planar members of device 1 to be made of colored plastic, colored paper, or colored metal; this may be accomplished by introducing coloring matter such as dye or pigment into the stock from which paper is made or into a plastic mix or by utilizing a metal such as copper or brass which has a distinctive color. In like manner the other side of device 1 is provided with color B′ corresponding to color B.

Referring now to FIGURE 10, one side of reel 9 may be identified by attaching thereto a label which may comprise, as shown, a layer of paper having a coating thereon such as ink or paint having coloring matter A therein. One side of device 1 may correspondingly be identified with corresponding color A′ by placing thereon a layer of coating material such as paint or ink comprising coloring matter A′. The other side of reel 9 and device 1 may be identified with corresponding coloring matters B and B′.

Referring to FIGURE 11, coloring matter contained in a coating may be utilized to identify the sides of reel 9 and coloring matter contained in a coating applied to layers of paper attached respectively to the sides of device 1, for example by adhesive bonding, may be utilized to identify the sides of device 1.

The paper having a layer of coloring matter thereon, as shown in FIGURES 10 and 11, is preferably attached to the reel or to device 1 by providing a layer of pressure sensitive adhesive 30 thereon.

Coloring matter may be applied to either side of either the reel or device 1 to cover the whole side thereof or may be applied to only a portion of the side and may provide a decorative pattern.

It may thus be seen that the invention is broad in scope and includes such modifications as will be apparent to those skilled in the art and is to be limited only by the claims.

Having thus described my invention, I claim:

1. A device of the type described for use with a reel of thin elongated strip film material comprising a reel and a first thin member extending between a side of the reel and the film material on the reel, a second thin member extending between the other side of the reel and the film material on the reel, and at least one member connecting said thin members, wherein said connecting member is spring means urging said thin members outwardly from each other into non-parallel relationship.

2. The device of claim 1 wherein two connecting members are provided, each of said connecting members being substantially planar in form, said connecting members being non-parallel and being substantially tangent to the outermost layer of said film material.

References Cited in the file of this patent

UNITED STATES PATENTS

| | | |
|---|---|---|
| 832,317 | Hinds | Oct. 2, 1906 |
| 1,086,472 | Schulz | Feb. 10, 1914 |
| 1,284,060 | Culman | Nov. 5, 1918 |
| 2,601,766 | Riddell et al. | July 1, 1952 |
| 2,929,166 | Sneide | Mar. 22, 1960 |
| 2,960,737 | Kirsch | Nov. 22, 1960 |

FOREIGN PATENTS

| | | |
|---|---|---|
| 896,770 | France | May 8, 1944 |